US011913799B2

(12) United States Patent
Todasco et al.

(10) Patent No.: US 11,913,799 B2
(45) Date of Patent: Feb. 27, 2024

(54) LOAD BALANCING FOR MAP APPLICATION ROUTE SELECTION AND OUTPUT

(71) Applicant: PAYPAL, INC., San Jose, CA (US)

(72) Inventors: Michael Charles Todasco, San Jose, CA (US); Gautam Madaan, San Jose, CA (US); Timothy Resudek, San Jose, CA (US); Braden Christopher Ericson, San Jose, CA (US); Cheng Tian, San Jose, CA (US); Jiri Medlen, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/867,384

(22) Filed: Jul. 18, 2022

(65) Prior Publication Data
US 2023/0009813 A1 Jan. 12, 2023

Related U.S. Application Data

(63) Continuation of application No. 16/890,440, filed on Jun. 2, 2020, now Pat. No. 11,391,585, which is a (Continued)

(51) Int. Cl.
*G01C 21/34* (2006.01)
*G01C 21/36* (2006.01)
(Continued)

(52) U.S. Cl.
CPC ...... *G01C 21/3484* (2013.01); *G01C 21/3476* (2013.01); *G01C 21/3667* (2013.01);
(Continued)

(58) Field of Classification Search
CPC ............ G01C 21/3484; G01C 21/3476; G01C 21/3697; G01C 21/3667; G01C 21/3679;
(Continued)

(56) References Cited

U.S. PATENT DOCUMENTS 8,234,063 B2 * 7/2012 Dhanani ............ G01C 21/3617
701/410
9,261,374 B2 * 2/2016 Mundinger .......... G06Q 10/047
(Continued)

*Primary Examiner* — Dale W Hilgendorf
(74) *Attorney, Agent, or Firm* — Haynes and Boone, LLP

(57) ABSTRACT

There are provided systems and methods for load balancing for map application route selection and output. A user may utilize a device application to map or route between two or more endpoints, such as geo-locations entered or detected by the device. During calculation of a travel route between the endpoints, real-time data, user preferences, and requesting entities may provide criteria data that may cause determination of a particular travel route, where the travel route may be longer than a most efficient route but within a pre-defined variable time or distance allotment and match the criteria data. Use of the route may accrue a form of compensation for the user. The user may view an application interface displaying the route, which may further include one or more executable processes to cause recalculation of the route. Recalculation of the route may require the user to provide credits or compensation.

20 Claims, 8 Drawing Sheets

Related U.S. Application Data continuation of application No. 15/789,886, filed on Oct. 20, 2017, now Pat. No. 10,670,414.

(51) Int. Cl.
*G06Q 30/0251* (2023.01)
*G06Q 10/047* (2023.01)

(52) U.S. Cl.
CPC ..... *G01C 21/3679* (2013.01); *G01C 21/3691* (2013.01); *G01C 21/3697* (2013.01); *G01C 21/3453* (2013.01); *G06Q 10/047* (2013.01); *G06Q 30/0261* (2013.01)

(58) Field of Classification Search
CPC ............ G01C 21/3691; G01C 21/3452; G06Q 30/0261; G06Q 10/047
See application file for complete search history.

(56) References Cited

U.S. PATENT DOCUMENTS

| | | | | |
|---|---|---|---|---|
| 9,488,485 B2* | 11/2016 | Letz | ................... | G01C 21/3484 |
| 9,927,252 B1* | 3/2018 | Chokshi | ............ | G01C 21/3461 |
| 10,274,328 B2* | 4/2019 | Grochocki, Jr. | ... | G01C 21/3676 |
| 10,324,463 B1 | 6/2019 | Konrardy et al. | | |
| 10,670,414 B2* | 6/2020 | Todasco | ............ | G01C 21/3667 |
| 11,391,585 B2* | 7/2022 | Todasco | ............ | G01C 21/3484 |
| 2005/0107951 A1* | 5/2005 | Brulle-Drews | .... | G01C 21/3697 |
| | | | | 701/533 |
| 2007/0239348 A1* | 10/2007 | Cheung | ............ | G01C 21/3423 |
| | | | | 701/467 |
| 2008/0091341 A1* | 4/2008 | Panabaker | ............. | G06Q 10/10 |
| | | | | 701/533 |
| 2009/0287408 A1* | 11/2009 | Gerdes | ............... | G01C 21/3423 |
| | | | | 701/533 |
| 2010/0027527 A1* | 2/2010 | Higgins | ............. | G01C 21/3484 |
| | | | | 370/351 |
| 2010/0036606 A1* | 2/2010 | Jones | ................... | G09B 29/106 |
| | | | | 705/400 |
| 2010/0280853 A1* | 11/2010 | Petralia | .................. | G06Q 10/02 |
| | | | | 705/13 |
| 2010/0332315 A1* | 12/2010 | Kamar | ............... | G06Q 30/0254 |
| | | | | 705/14.46 |
| 2011/0087430 A1* | 4/2011 | Boss | ..................... | G06Q 20/145 |
| | | | | 705/400 |
| 2011/0166958 A1* | 7/2011 | Hamilton, II | ........ | G06Q 10/067 |
| | | | | 705/13 |
| 2013/0013204 A1* | 1/2013 | Kazama | ............. | G01C 21/3461 |
| | | | | 701/533 |
| 2013/0262222 A1* | 10/2013 | Gibson | .............. | G01C 21/3423 |
| | | | | 701/538 |
| 2014/0006163 A1* | 1/2014 | Sengupta | ................ | H04W 4/21 |
| | | | | 705/14.58 |
| 2015/0149078 A1 | 5/2015 | Profous et al. | | |
| 2015/0330799 A1* | 11/2015 | Boss | ..................... | G06Q 20/145 |
| | | | | 705/13 |
| 2016/0109251 A1 | 4/2016 | Thakur | | |
| 2016/0245663 A1* | 8/2016 | van Dok | ............ | G01C 21/3676 |
| 2016/0328745 A1* | 11/2016 | Martin | ............... | G06Q 30/0273 |
| 2017/0069001 A1* | 3/2017 | Scofield | ................ | G08G 1/0141 |
| 2018/0073878 A1* | 3/2018 | Boss | ...................... | G01C 21/34 |
| 2018/0094943 A1* | 4/2018 | Grochocki, Jr. | ... | G01C 21/3492 |
| 2021/0110434 A1 | 4/2021 | Kimura | | |
| 2023/0008742 A1* | 1/2023 | Borgyos | ................ | G08G 5/045 |

\* cited by examiner

LOAD BALANCING FOR MAP APPLICATION ROUTE SELECTION AND OUTPUT

CROSS REFERENCE TO RELATED APPLICATION

This present application is a continuation of U.S. patent application Ser. No. 16/890,440, filed on Jun. 02, 2020 now U.S. Pat. No. 11,391,585 which is a continuation of U.S. patent application Ser. No. 15/789,886, filed on Oct. 20, 2017 now U.S. Pat. No. 10,670,414 all of which is hereby incorporated by reference in its entirety.

TECHNICAL FIELD

The present application generally relates to balancing routing loads during map application usage by multiple users and more specifically to processing user data with real-time routing data to output specific route displays in a map application based on user specific parameters.

BACKGROUND

An owner or operator of a vehicle may travel between two or more points, and may utilize a directional or map device application to receive routing instructions and a route or pathway between the points. Generally, travel routes or pathways are optimized by these applications and associated service providers (e.g., servers or cloud computing systems that provide data gathering and backend processing for the applications) based on time factors. For example, a map application, such as Waze®, may provide the shortest route between two endpoints or locations, which may be measured by distance and/or time. The map application may include common travel factors, such as traffic and speed of travel, during the determination of a travel route or pathway between locations. However, the user is in control of their vehicle and may have other considerations during travel that may influence selection of the pathway, which may be explicit or conscious requests by the user or other factors that the user may prefer, but not explicitly request. Thus, the user may miss specific points of interest when taking the shortest pathway, and other entities associated with the points of interest may not experience the benefits of the user visiting the points of interest along the user's travel route. Moreover, the map application may select pathways without regard to the local settings and/or nearby people or places, causing potential issues or missed opportunities for such entities along a route.

Figure 1:
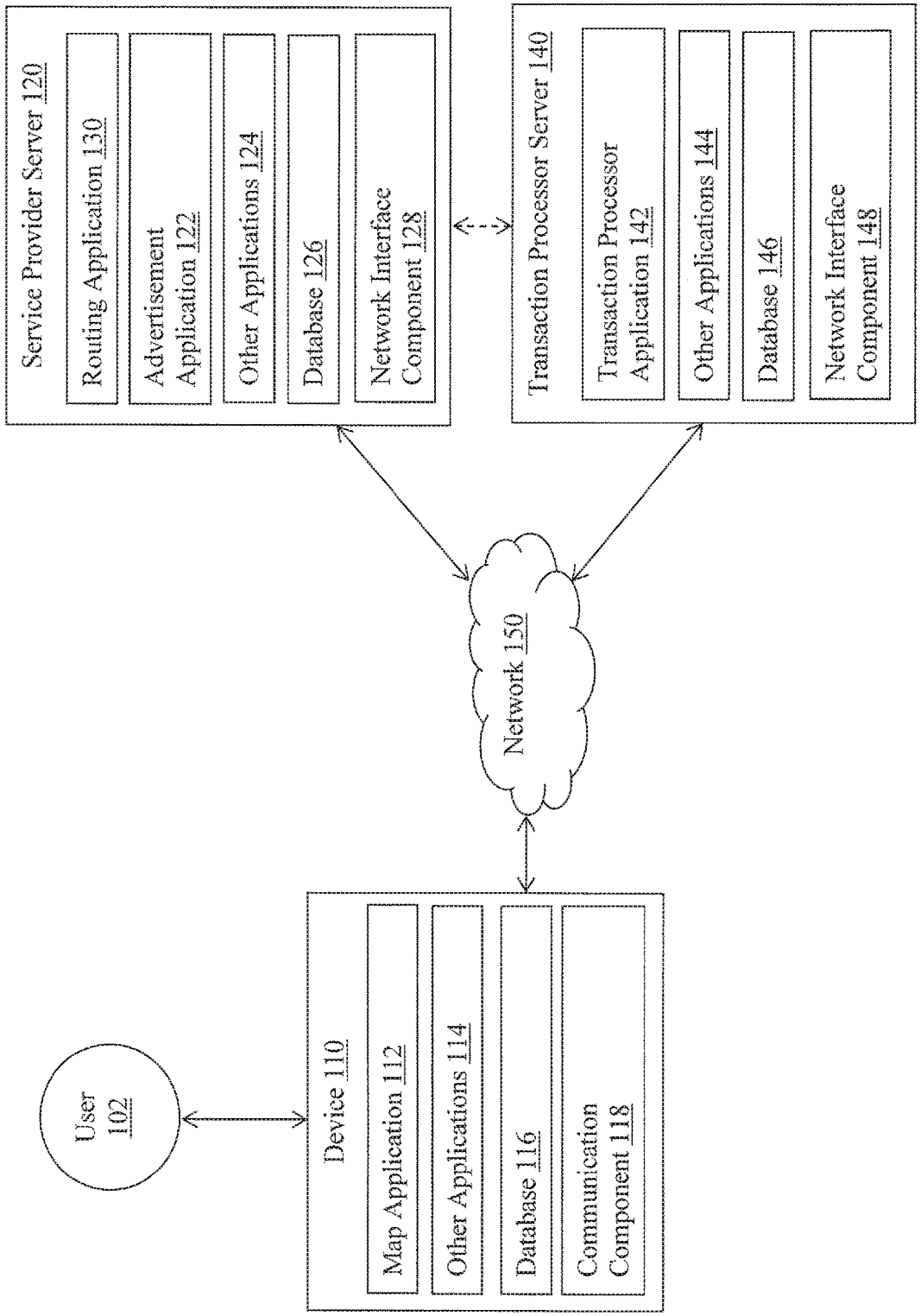
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide for load balancing for map application route selection and output. Systems suitable for practicing methods of the present disclosure are also provided.

In various embodiments, an owner, operator, or other user exerting control over a vehicle may wish to travel between two or more locations, such as a start location and an end or destination location. These locations may correspond to map points that are identified on a map, for example, through a location name or address. The map points may also correspond to geo-locations, which may be identified through a location detection system (e.g., GPS), through connections with nearby devices (e.g., through a short range communication protocol, such as BLUETOOTH™, WiFi, BLUETOOTH™ Low Energy, LTE Direct, infrared, radio, near field, or other communication protocol), and/or through location coordinates (e.g., longitude, latitude, altitude, etc.). In this regard, the user may utilize a computing device prior to or while traveling to a location and/or between locations, including travel by vehicle. The computing device for the user may correspond to a mobile device, such as a mobile smart phone, tablet computer, or other type of mobile device including device applications having executable processes to provide travel route determination and mapping functionality to the user. In other embodiments, the computing device may correspond to a device associated with the vehicle, such as a console computing device installed in the vehicle or other type of vehicle use device including GPS and mapping type devices that may be used with the vehicle for travel. The device may include mapping and routing functionality to determine a travel route between two or more locations, as well as a communication process to communicate with a service provider server, cloud computing architecture, or other network resource that may provide necessary data and processing capabilities to assist in travel route determination and map generation over a network connection with the device. Thus, the device may include at least a map application that may generate digital output displaying a map and a travel route between selected locations, and may generate the output data using the network resource. In certain embodiments, the device may include a GPS locator or other location detection service, which may be used to determine a current geo-location for the user utilizing one or more location detection processes (e.g., signal triangulation, radio-navigation with GPS satellites, etc.).

During travel and/or use of the device, the user may utilize a travel or mapping application of the computing device to enter in at least a destination endpoint. The destination endpoint may correspond to a physical name of a location, address for the location, or other identifier allowing the mapping application to determine a destination that the user wishes to travel to using the vehicle. The map application may include or retrieve map information allowing for the map application to determine the destination endpoint and display the destination endpoint on a map to the user. The map application may further receive a starting location, as well as any intermediary locations, which the map application may display on the map and/or use to determine a travel route between the locations. In various embodiments, the start location may be detected using the GPS locator or other location detection service of the device of the user, or may be input by the user (e.g., entering a home or work address, coordinates, etc.). The map application may utilize a service provider (e.g., the online resource) to retrieve the map information and/or determine a travel route between two or more locations.

The travel information having at least the destination endpoint for the user may be utilized by the application and/or service provider, such as an online resource or cloud computing network, to select a route to the destination endpoint based on at least certain route selection criteria and data. For example, multiple travel routes may be taken between a starting location and destination endpoint. Each travel route may have a different length of travel and/or travel time associated with the routes, such as a route taking freeways, toll roads, or main roads, and another route that travels on non-freeways, side roads, or city streets to the destination location. Data used to determine each travel route and an associated travel time/length may include preset data and/or real-time data, such as length of travel, travel time, traffic, road closures, street usage and/or traffic signs/signals, traffic congestion points or locations, weather, or other variables. For example, map data and/or traffic data may be used to determine each travel route and an associated time/length for the travel routes. Thus, the map data and/or traffic data may be used to determine multiple travel routes, as well as a shortest or most preferential travel route (e.g., based on time, length, ease of navigation/drive, cost, etc.). However, the route selection criteria used to determine a travel route may include additional information that influences or dictates a particular travel route over one or more other travel routes.

The route selection criteria may be utilized to determine a particular travel route of the multiple travel routes based on specific preferences, criteria, or other data particular to the user, points of interest on the travel route, and other user requests for selection of particular travel routes. The particularly selected or determined travel route may not correspond to a shortest time or distance travel route of each of the travel routes, or the most preferential route for the user based on user information and/or preferences. However, the determined travel route using the route selection criteria may be selected due to the data for the route selection criteria. Additionally, the determined travel route may be selected based on a variation amount from the shortest or most preferential route, where the variation amount may be measured by a variation in time and/or distance between the shortest/preferred route and one or more of the other travel routes (including the travel route determined based on the route selection criteria). The variation amount may correspond to a maximum variation amount set by the application/service provider and/or the user, and may correspond to a maximum amount or factor of time/distance difference between the two routes (e.g., the determined travel route and the shortest/preferred travel route). Thus, the determined route may be required to be the same or similar in length/time to the shortest/preferred route, or may be required to be within or equal to the maximum variation amount in length/time difference from the shortest/preferred route.

After determination of a travel route based on the map data and the route selection criteria, travel route data may be determined and visual output data for the map application may be generated. The travel route data may include data and/or executable processes that cause the map application to display the travel route between the locations/points in a graphical user interface of the device, such as a particular map interface of the map application that display a map having the travel route. The travel route may be highlighted or otherwise displayed on the map interface of the application, and the map interface may further include travel directions. The map application may include one or more audiovisual interfaces to output the travel directions, including audio output of the directions and/or travel route. Additionally, a location detection service/process of the device may be used to update the map application and the displayed map and/or route in the interface as the user travels to the destination endpoint, for example, by detecting a current location of the user and updating the map and/or route based on the current location of the user.

In various embodiments, the route selection criteria may include or correspond to advertisements and/or an advertisement campaign by an advertiser associated with the application/service provider or a partnered entity with the service provider that requests or purchases advertisement services provided by the application/service provider. In this regard, an entity wishing to advertise may request that the service provider set route selection criteria so that a determined route, as discussed above, may be selected and/or determined based on advertisements, products, or other visual and physical items along the route provide advertisements associated with or requested by the entity. Such a route may correspond to a "sponsored" route, or a route that an entity wishes to sponsor for use so that visual advertisements may be seen by users on the travel route. The advertisements may correspond to physical and visual advertisement spaces, such as traditional billboards, digital billboards (e.g., having an output display for an advertisement), and/or other types of visual advertisements including posters, signs, etc. The advertisements may also correspond to sales locations, such as a physical merchant storefront of the entity or storefront selling the entities products (e.g., an automotive dealership, a sales warehouse, a mall, etc.). Moreover, the advertisements may correspond to products or items sold or advertised by the entity, including houses, vehicles, electronics, and/or other items visual by a user while traveling on the travel route. Thus, the requested advertisements may correspond to visual sights along the sponsored travel route that a user may view while traveling on the travel route. The route selection criteria may therefore select routes that include the advertisements or visual sights, and may select or determine a travel route having more or the most advertisements over another travel route, provided the determined travel route meets other required travel restrictions/settings (e.g., within a maximum time/distance variation). Thus, the service provider may set the route selection criteria to correspond to advertisement preferences along a travel route, which may select travel routes based on an advertisement campaign. The entity requesting the advertisements may be required to provide compensation to the service provider for travel route selection along a route having the advertisements (e.g., for setting route selection criteria to select routes having the entities advertisements or products), which may also be provided back to users traveling along the determined travel routes, as discussed herein.

The route selection criteria may also correspond to points of interest to the user while traveling to one or more locations, for example, from the start location/point to the destination location/endpoint input to the map application. The points of interest may be utilized to select a travel route from a plurality of travel routes that is not the fastest, shortest, least expensive, or most preferred, but is within a time/distance/preference/cost variation, as described herein. Points of interest may correspond to advertisements discussed above, and may also correspond to other visual sights and things visible to the user while traveling on the travel route and that are of interest to the user based on user information and/or preferences. In this regard, points of interest may be determined based on user information and/or preferences set or stored by the application/service provider, and/or determinable by the application/service provider using available user data. The user may explicitly set points of interest and/or preferences for points of interest, such as landmarks, preferred advertising, items or products the user wishes to purchase (including land and/or housing the user wishes to purchase/rent), or other specific user preferences in visual sights along a travel route. The points of interest may also be determinable using past user data, such as web browser navigation, visited websites, searches on an Internet/database search engine, searches for items/products on a merchant marketplace, and/or other Internet traffic data. User information and corresponding points of interest for a user may also be determined using the user's social networking information and/or posts, blogging/micro-blogging information/posts, and/or other networking or media sharing activity by the user. Additionally, a calendar of the user, financial or payment bills of the user, a current balance of a financial account of the user, political preferences of the user, or planned purchases by the user may also be used.

In various embodiments, the user information used to determine points of interest may be used in conjunction with an advertisement requested by an entity or an established advertisement campaign, as discussed above, to select travel routes with advertisements of interest to the user. For example, if an entity wishes to advertise a brand of cars and the user is interested in a new car purchase, a travel route having advertisements for that brand of cars and/or including those cars (e.g., parked along the street or at purchasers homes) may be determined. The points of interest may also correspond to housing the user may be interested in based on a planned move or home purchase/rental, so that a travel route including locations/homes for sale/rent may be determined over another shorter/faster travel route. Thus, the user information and/or preferences may correspond to items that the user wishes to purchase (or rent), and may correspond to an item type, brand, specific single item, or other item parameter, which may be matched to an advertisement or advertisement campaign along a travel route to determine a travel route based on such user information/preferences in items. Thus, the user information/preferences may be matched to the advertisements as the points of interest, which may be advertisements requested to be presented by an entity or general advertisements known along the travel route. Once points of interest are determined, the points of interest may be established for the route selection criteria, and a travel route may be determined between two or more points based on such route selection criteria so that a travel route determined using the route selection criteria may favor or include visual landmarks, sights, or items corresponding to the points of interest. As discussed herein, such a determined travel route may be selected over a fastest, shortest, least costly (such as in terms of toll charges), or most preferred route based on such points of interest.

In various embodiments, current user information and/or parameters may be included in the route selection criteria. For example, a user may be detected in the vehicle so that the vehicle identifies the user when the user is inside the vehicle and/or utilizing the vehicle. The user may log in to a device in the vehicle, such as a center console computing device or heads up display by providing a log in credential to the device (e.g., a log in credential identifying a user account for the user, for example, a name and PIN/password associated with the user account). The user may also be detected when the vehicle's device connects to a communication device of the user. In such embodiments, the user may have a mobile/smart phone, wearable computing device (e.g., eyeglasses or wristwatch with processing features), tablet computer, or other user device that connects to the vehicle's device through short range wireless communications. Thus, the device for the vehicle may correspond to a dashboard or other onboard computing device, or may correspond to a device associated with the user exerting control over the vehicle, such a mobile/smart phone, tablet computer, wearable computing device, or other user device. Once the vehicle's device and the user's communication device connect, the user may be identified and checked-in to the vehicle.

The user may also be detected through biometrics and biometric reading devices utilized by the vehicle device, such as a fingerprint scanner (e.g., a fingerprint scanner on a door handle, steering wheel, or input device of the vehicle device), eye/retinal scanner, DNA reader, breathalyzer, etc. Once the user is detected in the vehicle, the device may determine a current or present state or activity parameter for the user. For example, an attention level of the user to viewing outside of the vehicle visual sights (e.g., advertisements or points of interest) may be determined based on eye movement of the user, device usage of the device by the user, audible voice sound within the vehicle, additional sound in the vehicle (e.g., a music stereo or radio broadcast), or other physical activity of the user. Thus, if the user's attention level to outside visual objects is low (e.g., the user is listening to the radio and only focusing on driving/street directions or looking at the user's mobile device or something else within the vehicle), the route selection criteria may favor a more direct, shortest, fastest, or most preferred route. Conversely, if the user's eye movement indicates that the user is looking out the window, such as viewing passing billboards, if the user is detected reading or speaking about passing objects, and/or if the user is not actively talking with another passenger or looking on a phone or item in or on the vehicle, the route selection criteria may favor a travel route including advertisements, points of interests, or other objects, where the travel route may not be the "best" (e.g., fastest, least costly, or shortest), but be within the acceptable deviation from the best route.

Moreover, a number of users in the vehicle at the time of determination of a travel route may be detected, as described above, and may be a factor in the route selection criteria. For example, a particularly advertised route may be selected based on advertisements for items/products/entities that cater to multiple users (e.g., dinner, activities, etc.), families, or other groups of users. A travel route may be selected based on the number of users, where the route may normally not be selected if only a single user may view the advertisements while driving, increasing the likelihood that the advertisements are ignored or lightly viewed by only the single driver of the vehicle. Additionally, an advertised route may accrue additional value or compensation for the driver of the vehicle by having multiple users.

In various embodiments, the route selection criteria may also be established by other users, groups of users, companies or business entities, or other organizational groups/entities (including charitable entities), which may dictate selection of a travel route for the user approaching the destination endpoint/location. In this regard, the route selection criteria established by another entity may include preference for selection of a certain travel route and/or deselection of a particular travel route or location/street/travel portion of a travel route between two or more locations. As discussed above, route selection criteria may be set to determine travel routes that cause advertisements or points of interest to be incorporated with and visible during travel on the travel route. Route selection criteria may also be set by the other entities to favor particular routes for other reasons, including traffic congestion, pollution, road wear and degradation, vehicle wear and maintenance, safety, or other concerns. Route selection criteria may also be set by particular entities based on time of day, traffic conditions, weather conditions, or other triggers that may cause the route selection criteria to determine other particular travel routes.

Additionally, entities may also request that certain locations, areas, streets, and/or travel routes be disfavored so as to deselect the travel routes or cause routing around the disfavored or dis-incentivized locations, areas, or routes. In this regard, one or more users or entities may request that route selection criteria be set to avoid particular locations, areas, or routes. For example, users in a particular neighborhood may receive traffic congestion or a large amount of through traffic where their neighborhood is within a travel route that is the shortest or fastest to one or more locations. Such neighborhoods may avoid other traffic or may be a most direct route through an area, and therefore cause unwanted traffic in the area. Thus, the users in the neighborhood may establish route selection criteria with the application and service provider to avoid the neighborhood area when calculating routes for users through an area and/or to a destination location. Such criteria may also be time based, for example, by avoid route calculation to cause through traffic at certain times, such as a time school starts or ends for children in the area. Thus, the route selection criteria may be set to select longer or less direct routes based on requests from other entities, where selection of another route to avoid the deemphasized area may be within the allowable deviation from the shortest/fastest/most preferred route.

A user may also request that particular travel routes be de-emphasized based on a route traveled by the user. For example, if the user wishes to sightsee in a particular portion of a city, the user may request that that area be de-emphasized in the route selection criteria. Thus, the route selection criteria may be established by entities to further disfavor particular areas during route selection provided that, when determining another travel route between two or more locations, the determined travel route is within a particular deviation or maximum variation from the route using that area. In certain embodiments, the entities setting the route selection criteria to avoid, de-emphasize, or dis-incentivize particular routes may be required to provide compensation for establishment or adherence of such route selection criteria. As discussed herein, the compensation may correspond to monetary or financial compensation, or may include credits within the system. Moreover, user information and/or preferences may also be used to deselect or deemphasize particular routes, for example, based on a driving record, age, driving experience, or other factors that may cause a particular travel route to be dangerous or non-preferred for the user.

The service provider may further provide options to select another travel route, such as a different travel route to view different advertisements and/or points of interest and/or a fastest/shortest/most preferred travel route. In this regard, when detected as traveling on or having traveled (e.g., reached the destination point) the travel route determined by the application/service provider using the route selection criteria, the user may accrue some form of compensation. The compensation may be monetary, such as a fee or payment provided to the user from the service provider and/or an entity requesting travel on the particular travel route based on the route selection criteria. For example, the user may collect a portion of ad revenue generated by the service provider for traveling on the determined travel route. The compensation may also be a form of digital currency and/or benefit system (e.g., incentive or loyalty program points). The compensation may be useable with the service provider to receive benefits or discounts, including benefits or discounts for products advertised along the travel route and/or for use with points of interest on the travel route. For example, a user may earn points or a discount amount for travel on a travel route that advertises product A with entity B, where the points/discount is redeemable with entity B, including for a purchase of product A. Additionally, the compensation may be used to earn levels or standing with the service provider, such as a tiered system or ranking, which may influence selection of travel route.

In certain embodiments, the application and service provider may be associated with a transportation provider, including a taxi service, vehicle reservation service, or other ride/travel request and reservation service for both driver and driver-less vehicles. The travel route may be selected using the route selection criteria described above, which may be longer than a shortest or fastest travel route determined by the system. However, as the travel route determined using the route selection criteria may be selected due to advertisements and/or points of interest, the overall fare for use of the transportation provider may be lowered if the user accepts travel on the determined travel route. Thus, the user may realize a discount or benefit from traveling on the travel route determined using the route selection criteria when using the transportation provider. In other embodiments, the application and/or service provider may interface and partner with a billing service for the user's vehicle, including an insurance company, car financing company, and/or other entity billing the user, where a reduction in a bill or fee for the user may be earned and applied by virtue of traveling on the travel route determined using the route selection criteria.

The application and/or service provider may further provide an application executable product to re-route between two or more locations after determination of a travel route. The option may request that a new or different travel route be determined by the application/service provider. The option to receive a different travel route may be provided as a selectable option to execute a process to calculate the different travel route. The option may allow the user to enter different parameters and/or request the fastest/shortest/most preferred travel route, such as a direct travel route between two or more locations. In response to selection of the option and/or a re-routing request, the application and/or service provider may determine and/or display a different route according to the requested parameters, such as a fastest, shortest, most direct, least expensive or costly (such as defined as not going through any toll roads), or most preferred route. Prior to selection of the option, this different route may be hidden from the user, so that the user may only view the travel route determined using the route selection criteria. The user may be required to pay for or provide a form of compensation in order to receive the interface option to execute the process to re-route travel to one or more locations. In certain embodiments, the user may receive the option to re-calculate or re-route the travel route between the locations based on a loyalty status, ranking, or rewards level of the user earned from previous use of travel routes determined by the application/service provider using route selection criteria. Where the route selection criteria is set by one or more other users and/or entities to disfavor an area, location, or route, the user may provide all or a portion of the compensation to those other users and/or entities if the user chooses to travel through the disfavored route. For example, the users populating a neighborhood and having requested the neighborhood be disfavored from routing pathways may receive all or part of the compensation from the user requesting a travel route that travels through the neighborhood when another travel route has previously been provided to the user based on the route selection criteria set by those users in the neighborhood.

In order to provide compensation, the device of the user may include a payment application or processes as one of the device applications or a part of the map application, which may be configured to send and receive payments to another party, such as another user and/or entity. The payment application may be associated with a transaction processor, such as PayPal® or other online payment provider service, which may provide payments and other financial services on behalf of user. The payment application may execute on the computing device for the user, and may provide various functionalities and processes to the user. For example, a user may utilize the payment application to send and/or receive payments between the user and another user/merchant/service provider for use of the various mapping functionalities described herein. The online payment provider may provide such services through the payment application/processes and data sent and received over a network connection between the provider and the device executing the payment application/processes. Additionally, the online payment provider may provide payment accounts and digital wallet services, which may offer financial accounts to send, store, and receive money, process financial instruments, and/or provide transaction histories. The online payment provider may offer further services, such as extension of credit, credit history review, and other financial and personal services.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a device 110, a service provider server 120, and transaction processor server 140 in communication over a network 150. User 102, such as a driver or operator of a vehicle corresponding to device 110 or utilizing device 110, may request determination of a travel route to one or more locations, for example, from a starting location to a destination location. An application executing on device 110 may utilize data for the starting and/or destination location to determine a travel route based on route selection criteria, for example, using service provider server 120 and available data and computing processes of service provider server 120. The travel route may be selected based on the route selection criteria over a different travel route, which may be a shortest, fastest, least expensive, or most direct route. In various embodiments, route selection by user 102 using device 110 may require or be provided compensation, which may be processed using transaction processor server 140.

Device 110, service provider server 120, and transaction processor server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Device 110 may be implemented using any appropriate hardware and software configured for wired and/or wireless communication with service provider server 120 and/or transaction processor server 140. In various embodiments, device 110 may be implemented as a device for use in a vehicle corresponding to device 110, such as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®, which may provide processing services for the vehicle. Device 110 may also be implemented as a device physically attached to and/or connected with the vehicle, such as a dashboard or central console computing system, a heads up display with attached processing devices, and/or a similar in-vehicle or on-board computing system. Although a single device is shown, the device may be managed or controlled by any suitable processing device. Although only one device is shown, a plurality of devices may function similarly, for example, a plurality of devices associated with a plurality of users each request travel route data between two or more locations. Furthermore, the processes and features of a routing application 130 of service provider server 120 may be implemented on device 110 instead of service provider server 120, for example, as processes incorporated in a map application 112 of device 110.

Device 110 of FIG. 1 contains map application 112, other applications 114, a database 116, and a communication module 118. Map application 112 and other applications 114 may correspond to processes, procedures, and/or applications, for example, a software program, executable by a hardware processor. In other embodiments, device 110 may include additional or different modules having specialized hardware and/or software as required.

Map application 112 may correspond to one or more processes to execute software of device 110 to provide travel route determination and display of one or more travel routes between two or more endpoints to a user. In this regard, map application 112 may correspond to specialized hardware and/or software utilized by device 110 to provide map features to user 102 through one or more instances or displays of application interfaces output using a graphical user interface (GUI) of device 110. Map application 112 may receive a destination location requested by the user and output a travel route to the destination location. For example, user 102 of communication device may enter a destination endpoint to map application 112, which may correspond to a desired endpoint that user 102 may wish to arrive at using a vehicle of user 102. In various embodiments, user 102 may also enter a starting location. However, map application 112 may also determine the starting location from a current location of device 110, which may be determined by a GPS locator and associated application of device 110 or other location detection system, as discussed herein. Map application 112 may also receive further updates to a current location of user 102 through the GPS or other location detection system. Map application 112 may determine a travel route from the starting/current point and the destination endpoint for user 102 using service provider server 120, for example, based on stored or available maps for locations corresponding to the starting/current point and/or the destination endpoint, as well as route selection criteria or other data that causes selection of one or more travel routes between the locations from a plurality of different travel routes each having an associated pathway, time of travel, and/or distance of travel. Thus, map application 112 may utilize service provider server 120 to determine the travel route between the starting/current point and the destination endpoint based on route selection criteria, for example, by communicating the starting/current point and the destination endpoint to service provider server 120, as discussed herein. In certain embodiments, route selection criteria may also be transmitted by map application 112 to service provider server 120, or may be received by map application 112 from service provider server 120 for use in calculation/determination of the travel route based on the route selection criteria. Moreover, user data, preferences, or other information may be sent and/or received by map application 112 for use in the travel route determination based on route selection criteria. However, in other embodiments, map application 112 may include the functionality, data, and resources to determine the travel route alone without use of service provider server 120 by including all or a portion of the features, processes, applications, and/or available data of service provider server 120.

Once the travel route is determined and/or received, map application 112 may output the travel route on a map interface displayed using a graphical user interface (GUI) and output display of device 110. Map application 112 may also receive traffic information, weather information, and/or other travel parameters from an online resource, which may be displayed with the travel route. The travel route output in the map interface may include direction, a graphic for display on a visual map, and/or other information used to direct a user to the destination location from user 102's starting/current location, which may be displayed using an interface of map application 112 and/or output using an audio device, such as speakers of device 110. In various embodiments, map application 112 may further receive data for an executable process to re-route or re-process travel data (e.g., location endpoints for travel between/to), and populate a selectable option within an interface that allows user 102 to execute a process to have a new or different travel route determined. User 102 may utilize an interface of map application 112 and/or one or more input devices to select the process, which may cause recalculation and determination of a new travel route, which may be based on other parameters instead of or with the route selection criteria.

In various embodiments, map application 112 may require payment or compensation for route recalculation. Map application 112 may include an interface to permit user 102 to enter input and other data for payment instruments, for example, through an input device (e.g., touch screen with a user interface displayed by map application 112, keypad/keyboard, mouse, etc.) and/or through a data capture device (e.g., scanner, camera, other optical device, etc.). In various embodiments, information for a payment account may also be stored to device 110. The payment account accessible through map application 112 may be used to initiate, receive, and/or process/complete transactions using services provided by transaction processor server 140. Once entered, the payment instruments may be communicated to transaction processor server 140 over network 150 for establishment and/or maintenance/update of the payment account and/or entry into the digital wallet. User 102 of device 110 may also enter benefits and/or compensation to map application 112, or may receive such benefits and/or compensation from service provider server 120 and/or transaction processor server 140, which may be accrued and/or used based on traveled or requested travel routes or pathways.

Map application 112 may be implemented as a user interface enabling user 102 to request travel routes, view travel route details, enter user preferences and/or route selection criteria/preferences, and/or receive or provide payment for a travel route taken by user 102. In various embodiments, map application 112 may include a general browser application configured to retrieve, present, and communicate information over the Internet (e.g., utilize resources on the World Wide Web) or a private network. For example, map application 112 may provide a web browser, which may send and receive information over network 150, including retrieving website information (e.g., a website for service provider server 120), presenting the website information to user 102, and/or communicating information to the website. However, in other embodiments, map application 112 may include a dedicated application of service provider server 120 or other entity, which may be configured to assist in processing travel route requests. In this regard, map application 112 may interface with one or more other applications and/or servers, for example, through application programming interface (API) calls and communications between map application 112 and the other data processing application/server.

Device 110 includes other applications 114 as may be desired in particular embodiments to provide features to device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow user 102 to send and receive emails, calls, texts, and other notifications through network 150. Such communication applications may also correspond to mobile, satellite, wireless Internet, and/or radio communication applications connected to car services, such as OnStar®, which may be configured to interact with one or more other processing entities in order to facilitate mapping, communication, and/or emergency services. Other applications 114 may include payment applications and/or services where not provided by map application 112. Thus, other applications 114 may include financial applications, such as banking, online payments, money transfer, or other financial applications. Other applications 114 may contain other software programs, executable by a processor, including a graphical user interface (GUI) configured to provide an interface for device 110 to the user.

Other applications 114 may also include processes and/or applications to detect user information and/or data, such as GPS applications configured to determine and/or display location information to user 102 and used in conjunction with map application 112 for routing purposes. Other applications 114 may also detect that user 102 is operating a vehicle, and may detect user information during operation of the vehicle. In order to detect user 102 and determine user information, other applications 114 may utilize one or more sensors, such as a door sensor, weight sensor, pressure sensor, key detector or ignition switch, biometric scanner (e.g., fingerprint reader, eye/retinal scanner, DNA reader, breathalyzer, etc.), log in process, device connection/communication module, camera, microphone, and/or proximity sensor. For example, user 102 may be detected when user 102 opens a door to utilize the vehicle, sits in a seat associated with the vehicle, or places a key in an ignition or in proximity to the vehicle. User parameters, physical conditions and/or movements, sounds, or other information may be determined using other application 114 and used during route determination using route selection criteria.

Device 110 may further include database 116 which may include, for example, identifiers such as operating system registry entries, cookies associated with map application 112 and/or other applications 114, identifiers associated with hardware of device 110, or other appropriate identifiers, such as identifiers used for payment/user/device authentication or identification. Database 116 may store identification information for one or more users, including user 102. In one embodiment, identifiers in database 116 may be used by transaction processor server 140 to associate device 110 with a particular account maintained by transaction processor server 140. Database 116 may further store routing data and/or map data, including a start location, and end or destination location, and/or maps used to navigate between the locations. Device 110 may store received or determined travel routes between the route locations to database 116. Additionally, database 116 may store route selection criteria or other route determination data, as well as user information or preferences used during determination of a route.

Device 110 includes at least one communication module 118 adapted to communicate with service provider server 120 and/or transaction processor server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, BLUETOOTH™, and near field communication devices. Communication module 118 may communicate directly with other nearby devices using short range communications, such as BLUETOOTH™ Low Energy, LTE Direct, radio frequency, infrared, BLUETOOTH™, and near field communications.

Service provider server 120 may be maintained, for example, by a service provider, which may determine travel routes for users between two or more locations based on route selection criteria that may dictate choice of a particular travel route from multiple different travel routes. In this regard, service provider server 120 includes one or more processing applications which may be configured to interact with device 110 and/or transaction processor server 140 to provide route determination and data output to device 110 to calculate and display a travel route. Although only one server is shown, a plurality of servers and/or associated devices may function similarly, for example, in a cloud computing type architecture or system. Additionally, although the processes and applications of service provider server 120 are shown as separate from device 110, the below described applications, modules, hardware, and functions may be included within device 110 and/or provided by device 110, for example, through map application 112.

Service provider server 120 of FIG. 1 includes routing application 130, an advertisement application 122, other applications 124, a database 126, and a network interface component 128. Routing application 130, advertisement application 122 and other applications 124 may correspond to executable processes, procedures, and/or applications with associated hardware. In other embodiments, service provider server 120 may include additional or different modules having specialized hardware and/or software as required.

Routing application 130 may correspond to one or more processes to execute software modules and associated specialized hardware of service provider server 120 to determine a travel route between a received destination endpoint and a current/starting location of user 102 based on route selection criteria, as well as user information and/or preferences in certain embodiments, and provide the travel route to device 110 as data for output and display through an instance of an interface of map application 112. In this regard, routing application 130 may correspond to specialized hardware and/or software to receive and/or access travel information for user 102 associated with device 110, where the travel information includes at least a destination endpoint selected by user 102 to travel to using a vehicle of user 102. The destination endpoint may correspond to an endpoint that user 102 desires to travel to using the vehicle, and may be entered to map application 112 of device 110 and transmitted to routing application 130 as the travel information and/or routing request. In various embodiments, the travel information may further include vehicle information, such as a type, size, brand, or other information about the vehicle of the user. The travel information may also include a starting or current location of user 102 for use in determining a travel route to the destination endpoint. Additionally, where necessary, routing application 130 may also receive route selection criteria and/or user information with the travel information and route determination request.

Routing application 130 may determine a travel route from multiple travel routes for use by user 102 when travelling to the destination endpoint requested by user 102 using route selection criteria available to routing application 130 with map data for the area or location having the travel endpoints. In this regard, routing application 130 may access mapping information for a plurality of locations, where the mapping information comprises maps for the plurality of locations. The maps may be used to determine one or more travel routes or pathways to the destination endpoint for user 102. For example, the maps may be used to determine multiple travel routes, each having a particular travel distance and/or time. The maps may include directional elements for the pathways. The maps may also be used to determine advertisements and/or points of interest along each pathway, which may be used with route selection criteria to select a pathway.

Routing application 130 may therefore use route selection criteria to determine and select one of the multiple travel pathways based on the visual objects and/or sights along the travel routes. For example, the route selection criteria may correspond to an advertisement request or campaign by service provider server 120 or another entity, such as a user, merchant, business, or advertising agency. The route selection criteria may therefore weigh routes having advertisements or other visual objects that advertise a product, business, or other item over other travel routes that do not have the advertisements or have less of the advertisements. Thus, the route selection criteria may correspond to a weight, factor, or preference for travel routes that advertise for an item set with the route selection criteria. Similarly, the route selection criteria may include factors or weights for objects of interest to user 102, such as potential home purchases, neighborhoods of potential home purchases, vehicle purchases, landmarks, sightseeing locations/objects, or other potential visual items that may be of interest to a user based on user information and/or preferences. The route selection criteria to select a different travel route or pathway from the shortest, fastest, least expensive, or more preferred route (e.g., a "best" route) may be limited by a maximum variation or deviation in time or distance between the travel route matching the route selection criteria and the "best" route.

User information and/or preferences for advertisements or other objects of interest may therefore be used by routing application 130 to determine a travel route when travelling to the destination endpoint selected by user 102. Routing application 130 may determine the user preferences based on past information, as well as additional information accessible by routing application 130, including online search history and/or navigation information, social media information, detected user physical parameters during travel, and/or other available user information. Once a travel route is determined based on the route selection criteria, as well as the user information, travel route data (e.g., data for output through map application 112) may be generated and may be communicated to map application 112 for display to user 102. If user 102 travels on the travel route, routing application 130 may be used to determine and provide compensation or a benefit for user 102 for use of the travel route determined using the route selection criteria. Such compensation may be provided to map application 112, stored in an account for user 102, and provided to transaction processor server 140 for processing and/or storage with an account of user 102.

In various embodiments, user 102 may decline the first travel route provided in map application 112 and request that routing application 130 determine another travel route. Routing application 130 may determine another travel route using the aforementioned information and/or entered parameters for the travel route by user 102 when requesting the new travel route. For example, user 102 may request a shortest or a fastest travel route, which may cause routing application 130 to generate travel route data for the shortest or fastest travel route (i.e., a travel route determined without using the route selection criteria) and provide the data to map application 112. In certain embodiments, user 102 may be required to pay or provide some form of compensation for the route re-calculation and use of a travel route either not initially determined using the route selection criteria or a travel route determined in contrast or opposing the route selection criteria (e.g., through a disfavored area based on other users' requests). Thus, routing application 130 may resolve payment for the compensation with map application 112, which may include using transaction processor server 140 to provide a payment. Additionally, if the user declines a travel route, routing application 130 may further adjust the user preferences based on the taken travel route so as to the same or similar travel routes.

Advertisement application 122 may correspond to one or more processes to execute software modules and associated specialized hardware of service provider server 120 to establish route selection criteria, including visible advertisements along travel routes and requests for travel route selection to see the advertisements, as well as other points of interest set by entities with service provider server 120. In this regard, advertisement application 122 may correspond to specialized hardware and/or software to receive advertisement locations, advertisements for display on a travel route (e.g., using a digital billboard), advertisement objects, an advertisement campaign (e.g., an item, product, or business an entity would like to promote), and/or other location data of visible objects on a travel route corresponding to points for interest to user 102 or set by another entity. The advertisement or other information (e.g., location data, etc.) may be communicated to service provider server 120 so that a travel route may be mapped that makes the advertisement or point of interest visible when traveling by the object on a travel route. In other embodiments, routing application 130 may generate the advertisement campaigns and/or determine advertisement or point of interest locations for use with the route selection criteria to select travel routes to view the objects. The advertisements and/or points of interest may therefore make visible the particular object to a passing user, such as user 102, when that user travels along the travel route output on map application 112.

Moreover, the route selection criteria set with advertisement application 122 may cause selection of a particular travel route that makes the object visible over a fastest, shortest, or most direct travel route.

In various embodiments, service provider server 120 includes other applications 124 as may be desired in particular embodiments to provide features to service provider server 120. For example, other applications 124 may include security applications for implementing server-side security features, programmatic server applications for interfacing with appropriate application programming interfaces (APIs) over network 150, or other types of applications. Other applications 124 may contain software programs, executable by a processor, including a graphical user interface (GUI), configured to provide an interface to a user.

Service provider server 120 may further include database 126 which may include, for example, identifiers such as operating system registry entries, cookies associated with routing application 130, advertisement application 122, and/or other applications 124, identifiers associated with hardware of service provider server 120, or other appropriate identifiers. Database 126 may include route selection criteria set by one or more entities and/or determined using available user information and/or advertisement/point of interest information. Database 126 may include determined travel routes, and well as map information for use in determining travel routes. Additional travel routes (e.g., a shorter, faster, or more direct) using the route selection criteria may also be stored to database 126 for later use. Moreover, database 126 may include benefits, compensation, or rewards information for use in providing to users and/or receiving from users during route selection/use and/or re-calculation.

Service provider server 120 includes at least one network interface component 128 adapted to communicate with device 110 and/or transaction processor server 140 over network 150. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, BLUETOOTH™, and near field communication devices.

Transaction processor server 140 may be maintained, for example, by an online transaction processor and payment service provider, which may provide transaction processing services associated with use of device 110. For example, transaction processor server 140 may correspond to a payment service provider and include one or more processing applications which may be configured to interact with device 110 and/or service provider server 120 to process payments and/or compensation account, as well as provide digital wallets and user accounts for use with payments or other compensation programs. In one example, transaction processor server 140 may be provided by PAYPAL®, Inc. of San Jose, CA, USA. Although only one server is shown, a plurality of servers and/or associated devices may function similarly. Although transaction processor server 140 is described as separate from service provider server 120, in some embodiments transaction processor server 140 may be incorporated with or associated with (e.g., shown with the dashed connecting line) service provider server 120.

Transaction processor server 140 of FIG. 1 includes a transaction processor application 142, other applications 144, a database 146, and a network interface component 148. Transaction processor application 142 and other applications 144 may correspond to processes, procedures, and/or applications, for example, a software program, executable by a hardware processor. In other embodiments, transaction processor server 140 may include additional or different modules having specialized hardware and/or software as required.

Transaction processor application 142 may correspond to one or more processes to execute software modules and associated specialized hardware of transaction processor server 140 to provide payment services to user and/or entities, for example through a payment account and/or payment instruments, and for establishment of route selection criteria, travel on a particular travel route, and/or recalculation of a travel route through a particular area (e.g., a disfavored area based on other users' paid request for route selection criteria to avoid the area). In this regard, transaction processor application 142 may correspond to specialized hardware and/or software to provide payment services and payment accounts, including digital wallets storing payment instruments. The payment services may allow for a payment to or receipt of a payment from one or more entities by a user through a payment instrument, including a credit/debit card, banking account, payment account with service provider server 120, and/or other financial instrument. The payment may be for use of a particular travel route, including receiving compensation for taking a sponsored travel route for advertisements or points of interest and/or providing compensation for taking a non-sponsored or disfavored route. In order to establish a payment account for a user to send and receive payments, transaction processor application 142 may receive information requesting establishment of the payment account. The information may include user personal and/or financial information. Additionally the information may include a login, account name, password, PIN, or other account creation information. The user may provide a name, address, social security number, or other personal information necessary to establish the account and/or effectuate payments through the account. Transaction processor application 142 may further allow the user to service and maintain the payment account, for example, by adding and removing payment instruments.

Transaction processor application 142 may be used to provide or receive a payment associated with use of a travel route. Map application 112 and/or routing application 130 may arrange for the payment, which may correspond to monetary compensation and/or a benefit, reward, digital points, or other form of non-monetary and/or digital compensation or currency. Transaction processor application 142 may debit an account of the user/entity automatically and provide the payment to an account of the receiving user/entity. Transaction processor application 142 may also be used to provide transaction histories for processed transactions. Based on the transaction processing, transaction data may be pushed to device 110 and/or pulled by device 110.

In various embodiments, transaction processor server 140 includes other applications 144 as may be desired in particular embodiments to provide features to transaction processor server 140. For example, other applications 144 may include security applications for implementing server-side security features, programmatic server applications for interfacing with appropriate application programming interfaces (APIs) over network 150, or other types of applications. Other applications 144 may contain software programs, executable by a processor, including a graphical user interface (GUI), configured to provide an interface to a user.

Additionally, transaction processor server 140 includes database 146. As previously discussed, user 102 and/or a person/entity providing or requesting route selection criteria and/or particular travel route determination/use may establish one or more payment accounts with transaction processor server 140. User accounts in database 146 may include user information, such as name, address, birthdate, payment/funding information, additional user financial information, and/or other desired user data. Account holders may link to their respective accounts through a user and/or device identifier. Thus, when an identifier is transmitted to transaction processor server 140, e.g. from device 110 and/or service provider server 120, an account may be found. In other embodiments, user 102 and/or the person/entity requesting establishment or route selection criteria and/or travel route determination/use may not have previously established an account and may provide other information to transaction processor server 140 to process actions by transaction processor application 142, as previously discussed. Additionally, database 146 may store received information, including compensation amounts and/or programs for use with travel route determination, route selection criteria establishment, and/or particular travel route determination and/or use (e.g., through a restricted or disfavored area).

In various embodiments, transaction processor server 140 includes at least one network interface component 148 adapted to communicate device 110 and/or service provider server 120 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
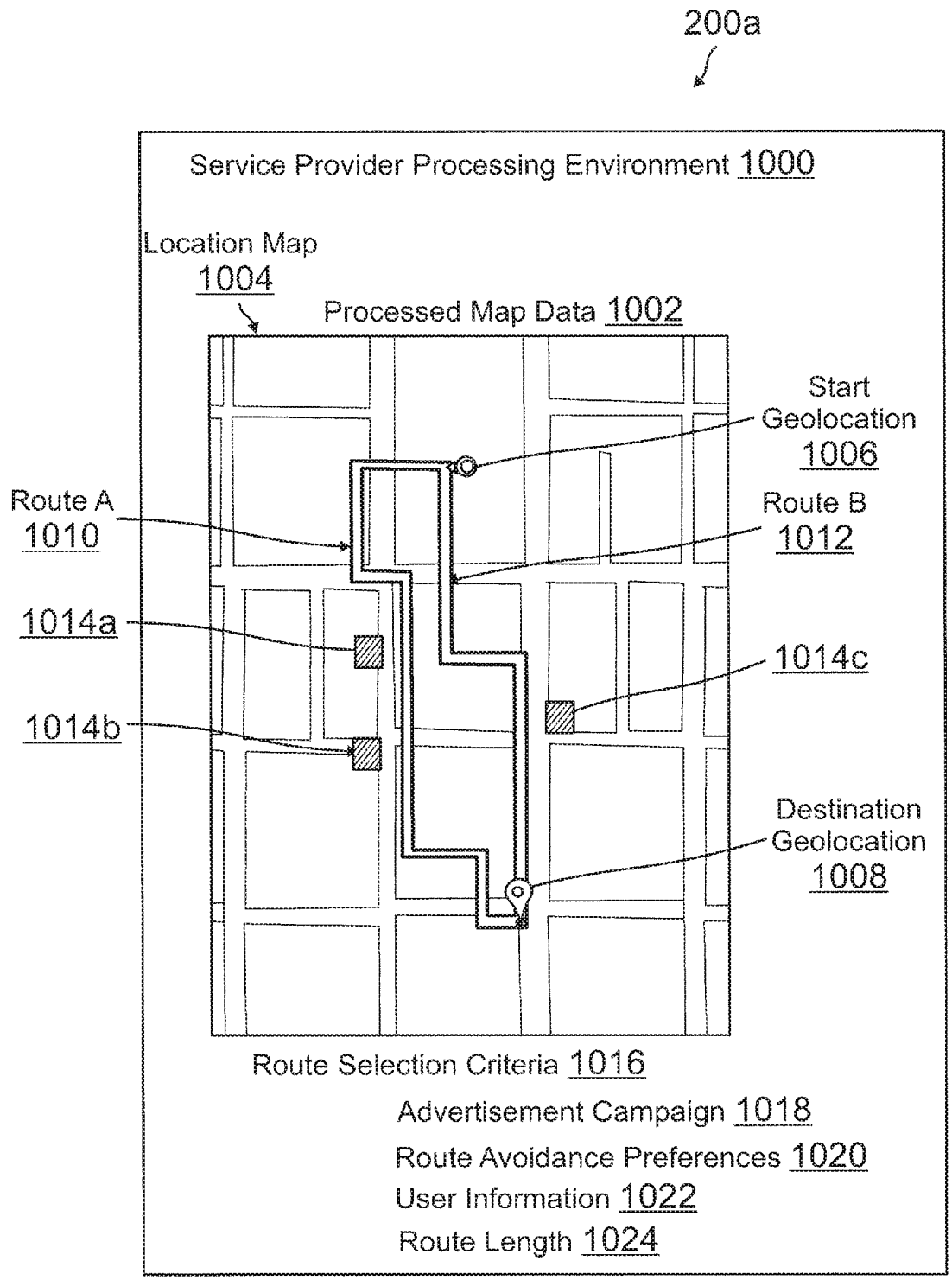
FIG. 2A is an exemplary travel route data determination of multiple travel routes for a device prior to output of a selected travel route through a graphical user interface, according to an embodiment.

FIG. 2A is an exemplary travel route data determination of multiple travel routes for a device prior to output of a selected travel route through a graphical user interface, according to an embodiment. Environment 200a of FIG. 2A includes a service provider processing environment 1000 corresponding generally to processed data by service processor server 120 in system 100 of FIG. 1, such as travel routes determined between points of travel, where one or more of the travel routes is further determined using route selection criteria or other data.

In environment 200a, service provider processing environment 1000 includes processed map data 1002 having a location map 1004 for an area including a start geo-location 1006 and a destination geo-location 1008. Data for location map 1004 may be retrieved based on a user, such as user 102 in system 100, entering at least destination geo-location 1008, where the user may also enter start geo-location 1006 or start geo-location 1006 may be detected using a location detection system (e.g., a GPS system). Service provider processing environment 1000 may utilize location map 1004 with start geo-location 1006 and destination geo-location 1008 with route selection criteria 1016 to determine a route A 1010 and a route B 1012. For example, object 1014a, object 1014b, and object 1014c may correspond to advertisements, points of interest, or other visible objects that may be seen by a user when traveling along a travel route. Route selection criteria 1016 may be used to select one of route A 1010 or route B 1012 based on route selection criteria indicating that the user traveling from start geo-location 1006 to destination geo-location 1008 should view one or more of objects 1014a-c.

In various embodiments, route selection criteria 1016 may include an advertisement campaign 1018 for advertisement of one or more of objects 1014a-c, route avoidance preferences to avoid an area in location map 1004 (or along a pathway from start geo-location 1006 to destination geo-location 1008) and/or one or more of objects 1014a-c, user information 1022 that may indicate a user would like to view or avoid an area in location map 1004 and/or one or more of objects 1014a-c, and/or route length 1024 that includes data for a time or distance of route A 1010 and route B 1012 and a maximum variation or difference between route A 1010 and route B 1012 allowable for selection of the longer route. For example, route A 1010 is shown as passing objects 1014a and 1014b, while route B 1012 is shown as passing only object 1014c. Additionally, route A 1010 includes more turns and is longer than route B 1012. However, route A 1010 may be selected as the travel route based on one or more factors of route selection criteria 1016 so that a user travelling route A 1010 may view, hear, or otherwise experience visible objects on route A 1010 including objects 1014a and 1014b. Advertisement campaign 1018 may dictate that the user take route A 1010 to view objects 1014a and 1014b, which may correspond to advertisements, and user information 1022 may further be used to make such a determination, for example, if objects 1014a and 1014b correspond to advertisements of interest to the user. In other embodiments, route avoidance preferences 1020 may be used to determine that the user should not take route B 1012, for example, to avoid traveling through an area and/or by object 1014c. Moreover, route A 1010 may be selected because route length 1024 allows selection of route A 1010 as being within an acceptable deviation or variation of time/distance from route B 1012. Once determined, data may be generated for the interface of FIG. 2B.

Figure 2B:
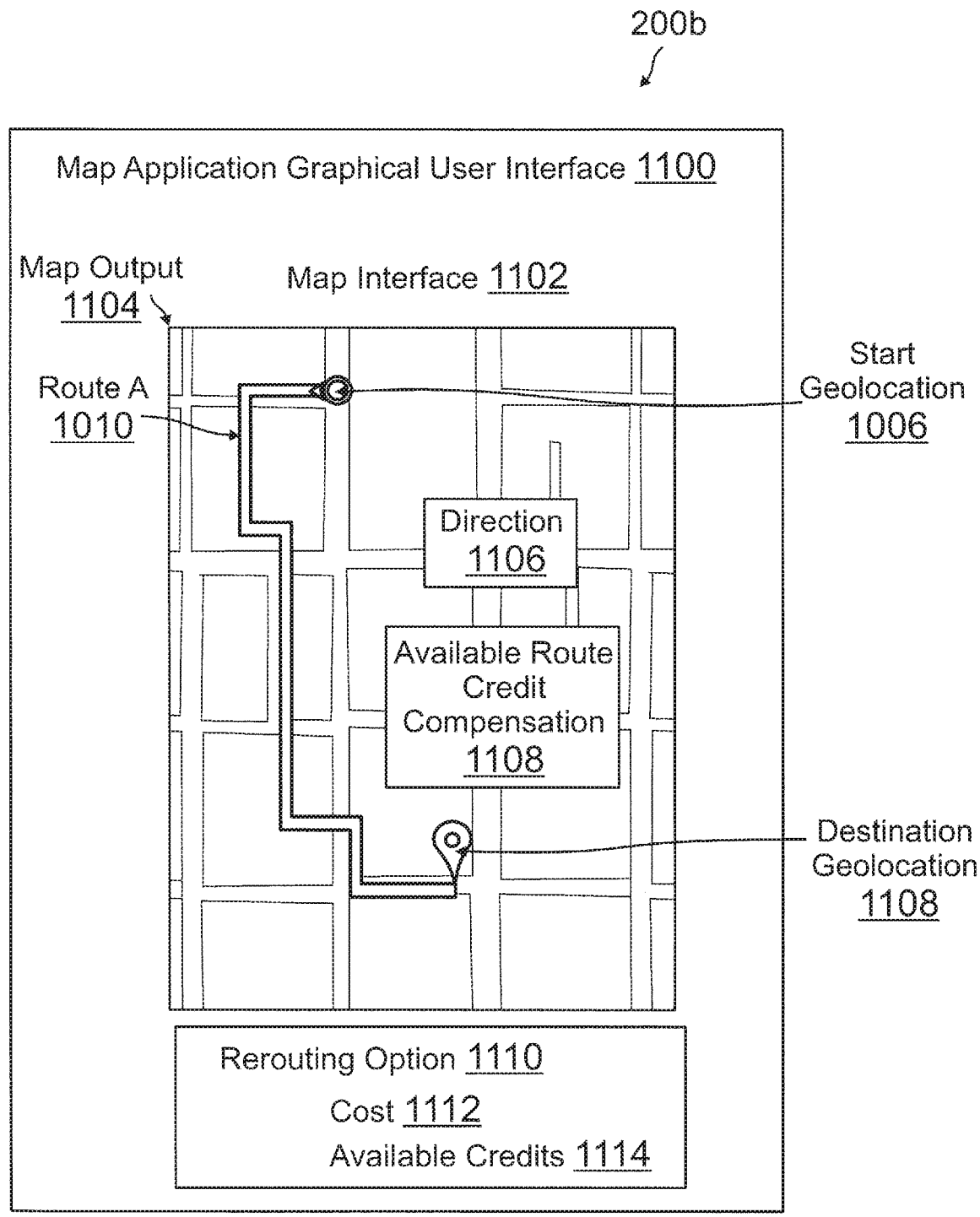
FIG. 2B is an exemplary graphical user interface of a device displaying a selected travel route to travel to an endpoint based on route selection criteria, according to an embodiment.

FIG. 2B is an exemplary graphical user interface of a device displaying a selected travel route to travel to an endpoint based on route selection criteria, according to an embodiment. Environment 200b of FIG. 2B includes a map application graphical user interface (GUI) 1100 corresponding generally to a graphical user interface displayable by device 110 in system 100 of FIG. 1, for example, a GUI displaying received and processed data for a travel route between two endpoints determined using route selection criteria 1016 in environment 200a of FIG. 2A.

In environment 200b, a user is traveling in a vehicle and has utilized a device, such as device 110 in system 100, to request a travel route to destination geo-location 1008, where start geolocation 1006 may be entered to the device or detected by the device using a processing component. As discussed in FIG. 2A, a service provider processing environment may determine a travel route, such as route A 1010 between start geo-location 1006 and destination geo-location 1008. Map interface 1102 displayable within map application GUI 1100 may display data received from a service provider (or determined by a device application in certain embodiments) for a travel route, including map output 1104 displaying route A 1010 between start geo-location 1006 and destination geo-location 1008. Noticeably absent from map output 1104 in map interface 1102, however, is route B 1012, which remains hidden from display to the user based on determination of route A 1010 as being acceptable for routing and output to the user based on route selection criteria 1016 in FIG. 2A. Thus, the user may only view route A 101, as well as direction 1106 for travel on route A 1010. Map interface 1102 may further display an available route credit compensation 1108 for traveling on route A 1010 where the user may accrue rewards or compensation for taking route A 1010 over another route, such as route B 1012 in FIG. 2A. Map application GUI 1100 may also provide an executable option, such as rerouting option 1110, which may allow the user to view another route, such as route B 1012 in FIG. 2A. Rerouting option 1110 may be associated with a corresponding cost 1112, which may be paid with using available credits 1114 accrued from other route travel, purchase in the system, or payment using a payment instrument.

Figure 2C:
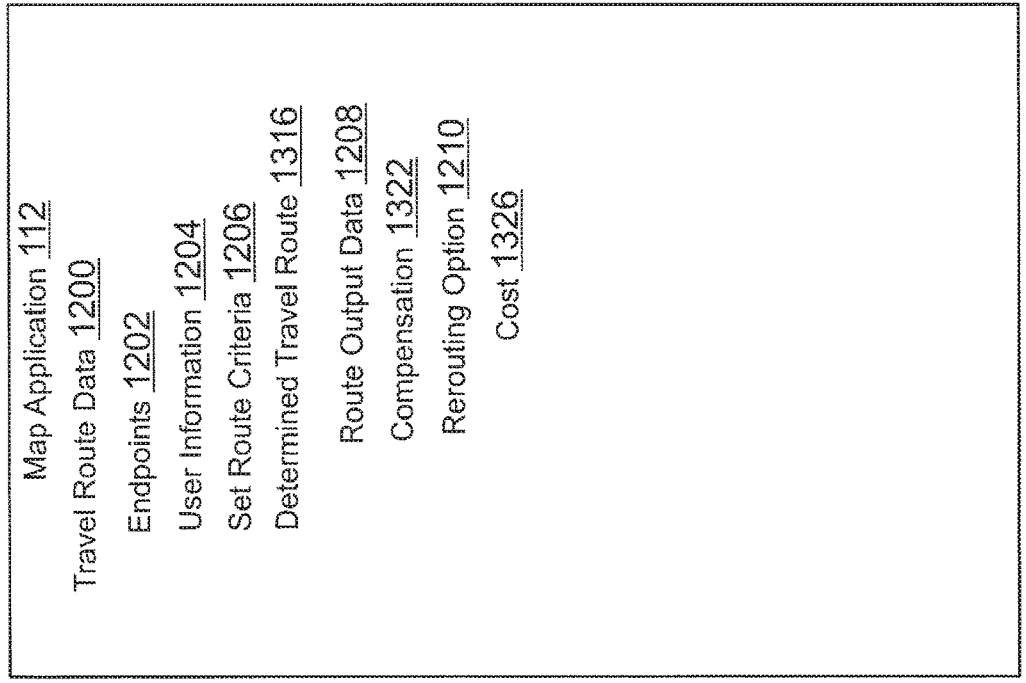
FIG. 2C is an exemplary system environment for determination of the selected travel route based on route selection criteria, according to an embodiment.

FIG. 2C is an exemplary system environment for determination of the selected travel route based on route selection criteria, according to an embodiment. Environment 200c of FIG. 2C includes a map application 112 and a routing application corresponding generally to the applications discussed in reference to system 100 of FIG. 1 and executed by device 110 and service provider server 120, respectively, of FIG. 1.

Map application 112 corresponds generally to the specialized hardware and/or software modules and processes described in reference to FIG. 1. In this regard, map application 112 may be utilized to receive a travel route an output the travel route through a GUI of a device, where the travel route may be determined by routing application 130 using route selection criteria. Map application 112 may include travel route data 1200 including endpoints 1202. Travel route data 1200 may also include input by a user, which may correspond to user information 1204 and/or set route criteria 1206. Once a travel route is determined, travel route data 1200 of map application 112 may further include determined travel route 1316. Determined travel route 1316 may include various data for output through one or more application interfaces, including route output data 1208, compensation 1322 for taking a travel route and/or differing between travel routes, and a rerouting option 1210 with an associated cost 1326.

Routing application 130 corresponds generally to the specialized hardware and/or software modules and processes described in reference to FIG. 1. In this regard, routing application 130 may be used to determine a travel route between two or more points based on route selection criteria, where the determined travel route may be based on visual objects on the travel route and may differ from a shortest, fastest, least expensive, or most direct travel route. Routing application 130 includes travel route processing data 1300 used to determine a travel route and output the travel route using map application 112. For example, travel route processing data 1300 includes points 1202 for a travel route, which may be processed using route selection criteria 1302, available routes 1310, and/or user information 1204 to generate determined travel route 1316. Route selection criteria may 1302 may include advertisements 1304, points of interest 1306, set route criteria 1206, and/or a maximum variation 1308. Such criteria may be processed with data for available routes 1310, including lengths 1312 and visible objects 1314 for each travel route in available routes 1310 to generated determined travel route 1316. In various embodiments, information 1204 may also be used to generate determined travel route 1316. Determined travel route 1316 may be associated with a route length 1318, route objects 1320, and compensation 1322 provided for travel on determined travel route 1316. Additionally, travel route processing data 1300 may include rerouting information 1324, including a cost 1326 and requested parameters 1328 for rerouting.

Figure 3A:
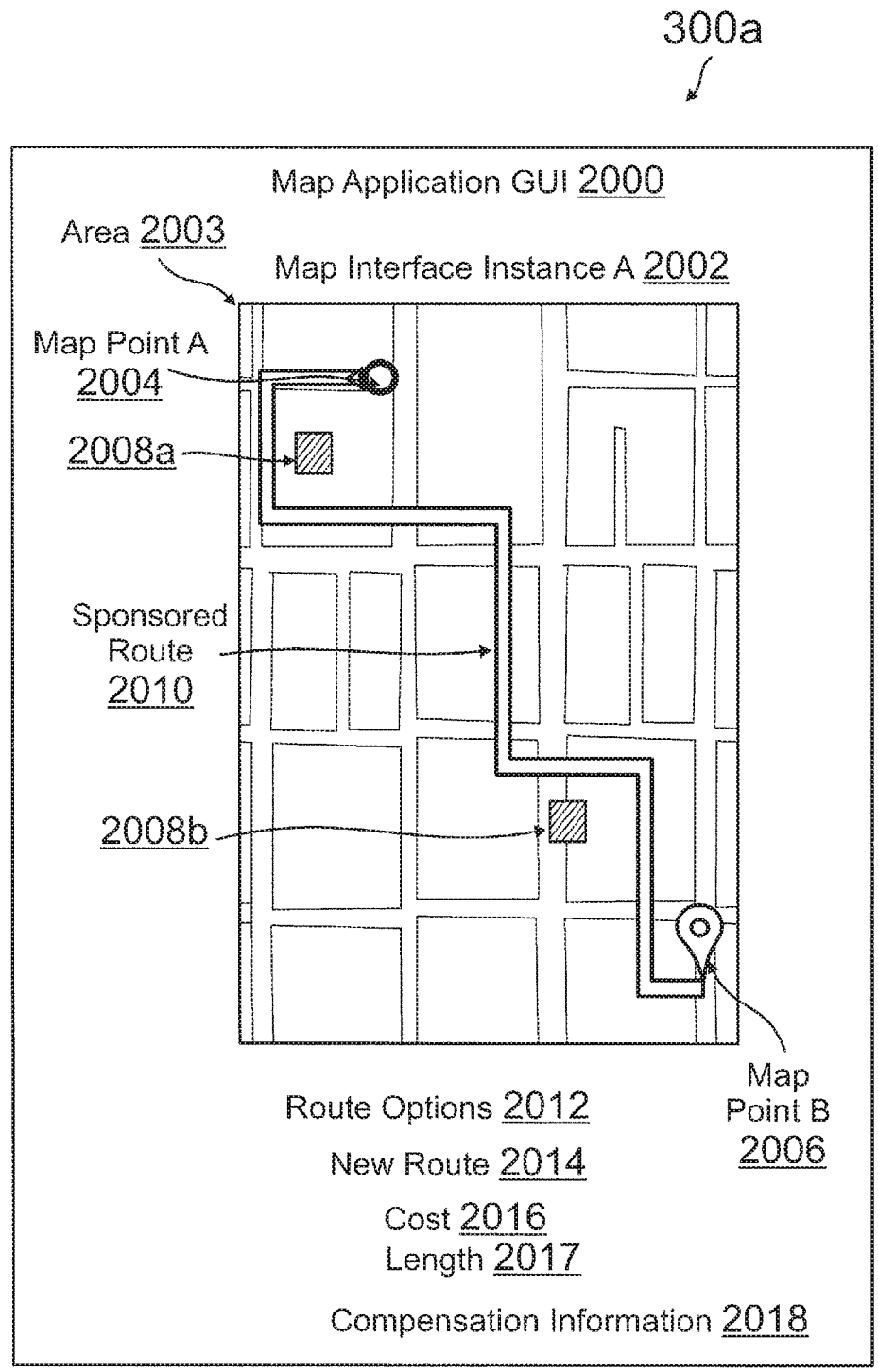
FIG. 3A is an graphical user interface of a device displaying a first travel route to travel to an endpoint based on route selection criteria, according to an embodiment.

FIG. 3A is an graphical user interface of a device displaying a first travel route to travel to an endpoint based on route selection criteria, according to an embodiment. Environment 300a of FIG. 3A includes a map application graphical user interface (GUI) 2000 corresponding generally to a graphical user interface displayable by device 110 in system 100 of FIG. 1, for example, a GUI displaying received and processed data for a travel route between two points determined using route selection criteria.

In this regard, map application GUI 2000 displays a travel route determined based on route selection criteria that is longer than a direct travel route. Map interface instance A 2002 displays an area 2003 displaying map information including map point A 2004 and map point B 2006. Area 2003 further includes visual advertisement 2008a and visual advertisement 2008b. Thus, an advertisement setting, campaign, or other preference set for route selection criteria may be used to determine sponsored route 2010 between map point A 2004 and map point B 2006 that allows a user traveling on sponsored route 2010 to view visual advertisements 2008a and 2008b. Thus, sponsored route 2010 may be longer than a more direct route between map point A 2004 and map point B 2006 but may be determined and selected based on route selection criteria that dictates the user should view visual advertisements 2008a and 2008b.

With display of sponsored route 2010, map application GUI 2000 may also display route options 2012, which may correspond to executable processes to receive a new travel route. Route options 2012 may include new route 2014 option, which may have an associated cost 2016 and a length 2017, which may indicate a time or distance savings over sponsored route 2010. Additionally, compensation information 2018 may be used to view cost information for receiving new route 2014, an amount of available funds or value in an account, and/or a value or amount received as compensation for taking sponsored route 2010. If the user associated with map application GUI 2000 selects new route 2014, map application GUI 2000 may update an interface instance or display shown in FIG. 3B.

Figure 3B:
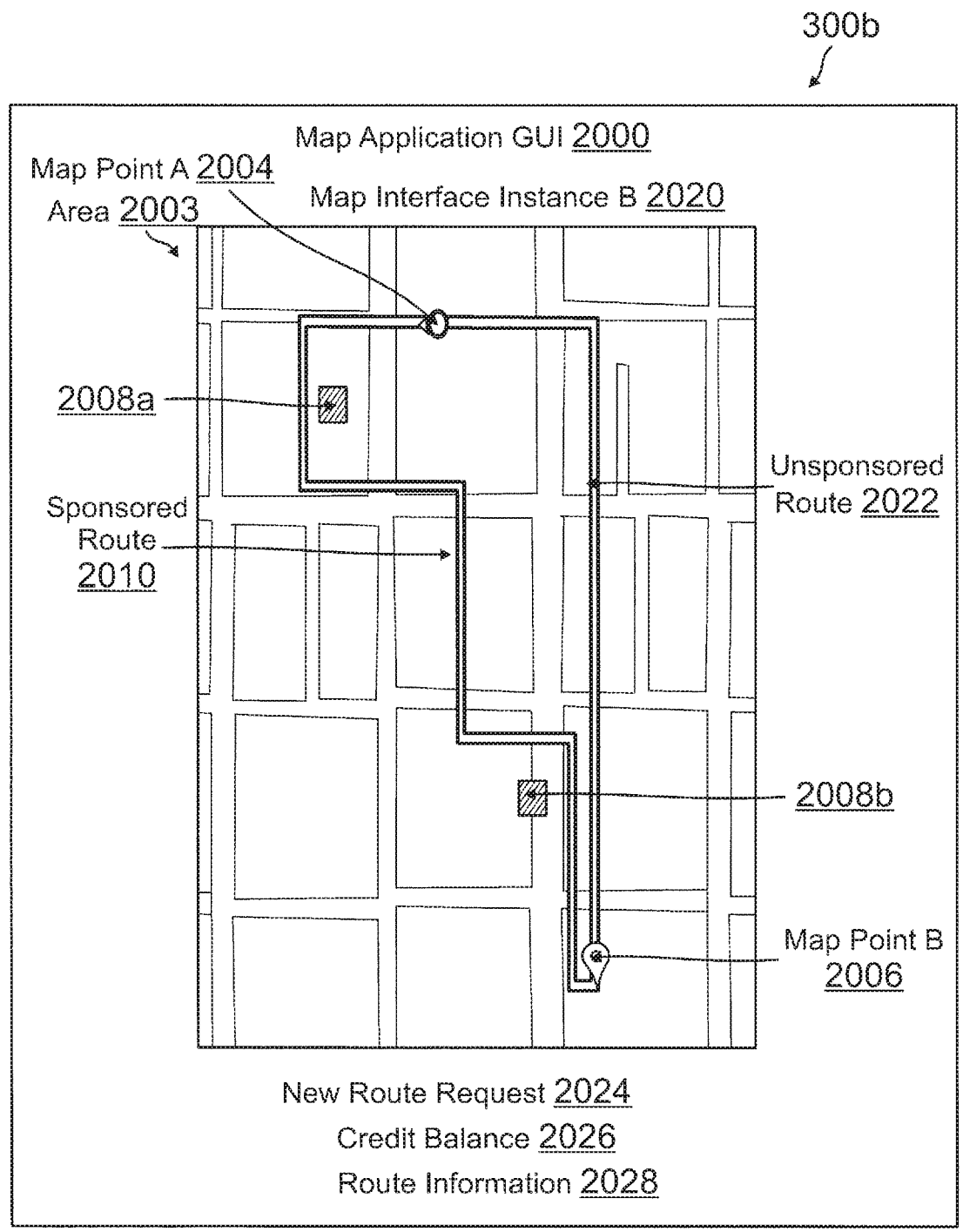
FIG. 3B is an graphical user interface of a device displaying a first travel route to travel to an endpoint based on route selection criteria and a second travel route displayed in response to a user request, according to an embodiment.

FIG. 3B is an graphical user interface of a device displaying a first travel route to travel to an endpoint based on route selection criteria and a second travel route displayed in response to a user request, according to an embodiment. Environment 300b of FIG. 3B includes map application graphical user interface (GUI) 2000 corresponding generally to a graphical user interface displayable by device 110 in system 100 of FIG. 1, for example, a GUI displaying received and processed data for a travel route between two points determined using route selection criteria. Map application GUI 2000 may display a new instance, such as map interface instance B 2020 updated based on input to map interface instance A 2002 in environment 300a of FIG. 3A.

In this regard, after selection of route options 2012, such as new route 2014 in map interface instance A 2002, map application GUI 2000 in environment 300b may update map interface instance B 2020 showing unsponsored route 2022 in area 2003. Unsponsored route 2022 is shown as a more direct, faster, and/or shorter route from map point A 2004 to map point B 2006. Unsponsored route 2022 is shown as avoiding visual advertisements 2008a and 2008b that are visible on sponsored route 2010. Thus, unsponsored route 2022 may only be shown after request by the user. Map interface instance B 2020 map further display data for unsponsored route 2022 and the associated request for unsponsored route 2022, such as new route request 2024, a credit balance 2026 after processing new route request 2024, and route information 2028 for unsponsored route 2022.

Figure 4:
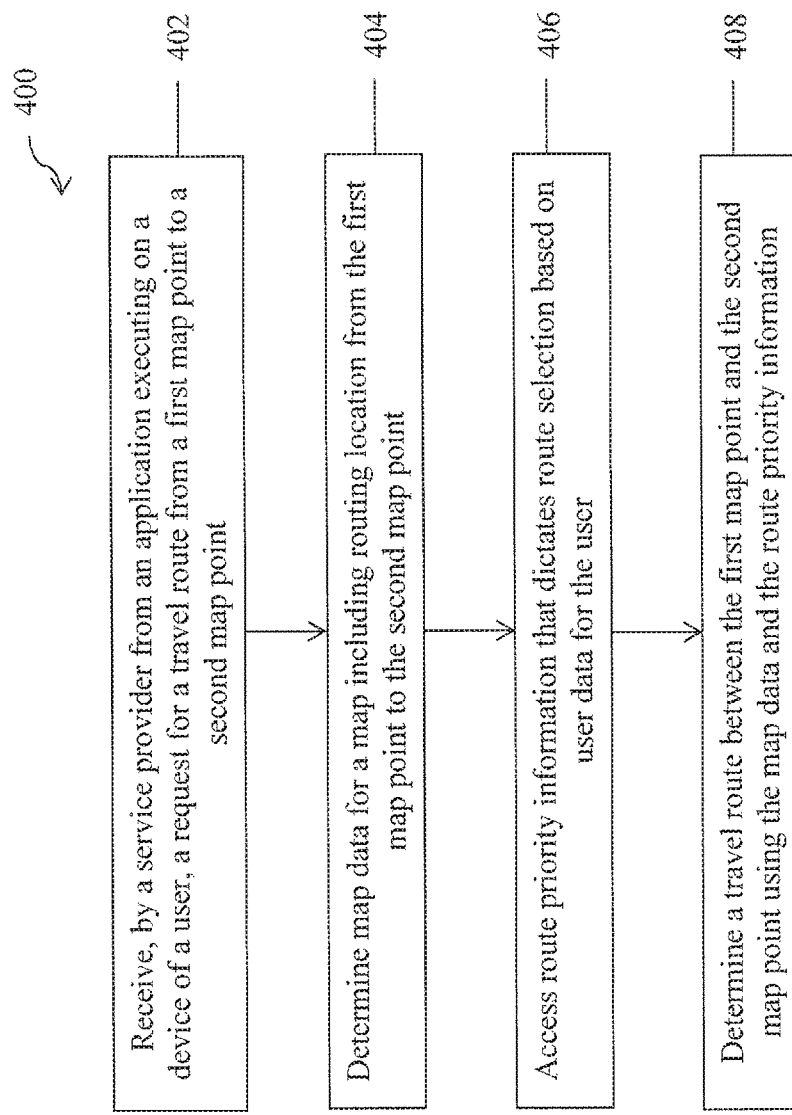
FIG. 4 is a flowchart of an exemplary process for load balancing for map application route selection and output, according to an embodiment.

FIG. 4 is a flowchart of an exemplary process for load balancing for map application route selection and output, according to an embodiment. Note that one or more steps, processes, and methods described herein of flowchart 400 may be omitted, performed in a different sequence, or combined as desired or appropriate.

At step 402, a request for a travel route from a first map point to a second map point is received by a service provider from an application executing on a device of a user. In various embodiments, the points may be geo-locations and/or entered location identifiers.

At step 404, map data for a map including routing location from the first map point to the second map point is determined.

A route priority option for the user is accessed, such as route selection criteria, wherein the route priority option dictates route selection based on user data for the user, at step 406. Route priority options, or route selection criteria, may comprise advertisements visible on each of a plurality of travel routes and at least one of a set time maximum variation, set cost maximum variation, or a set distance maximum variation from a shortest travel route of the plurality of travel routes between the points/location.

At step 408, a travel route between the first map point and the second map point is determined using the map data and the route priority option. The travel route may be determined from a plurality of different travel routes. The travel route may be required to be within the at least one of the set time, set cost, or set distance maximum variation from the shortest travel route, and may be determined to provide at least one of the advertisements on the travel route. The advertisements may correspond to or instead be points of interest, such as a billboard, an advertisement, a house, a vehicle, a sales location, a political message, or a social gathering. Additionally, the travel route may be determined using user interests, preferences, or information, including an Internet search performed by the user, preferences set by the user, a calendar of the user, financial or payment bills of the user, a current balance of a financial account of the user, political preferences of the user, social networking site data, or planned purchases by the user. Thus, the travel route may have an advertisement or point of interest corresponding to an item the user wishes to purchase/rent or is otherwise interested in. In certain embodiments, the travel route may correspond to a sponsored travel route by an advertiser, which is longer than a shorter/faster route but within the allowable variation and includes advertisements, objects, or other visible items corresponding to the sponsorship by the advertiser. Additionally, an advertisement campaign may be displayed or output on a digital advertisement display visible on the travel route based on the sponsored route for the advertiser, as well as interests of the user. The sponsored route may be longer than an unsponsored route between the points/locations, but may accrue a benefit to the user. Thus, an option to display the unsponsored route may be output through the application interface, wherein selection of the option to display the unsponsored route prevents the benefit from accruing for using the sponsored route.

In certain embodiments, a route selection preference from at least one additional user associated with one of the plurality of travel routes may be received, wherein the route selection preference requests that the one of the plurality of travel routes not be selected for display when determined travel route data for the travel route of the plurality of travel routes. This may be provided as an option to the at least one additional user, for example, in an application or through a website process, and may require a compensation amount to be received with the route selection preference. Additionally, it may be required that the at least one additional user be within an occupied location in a proximity range to the one of the plurality of travel routes that the at least one additional user is entering the route selection preference for. Additionally, the application may comprise a ride service application for hiring the vehicle to travel to the points/locations, wherein the travel route is determined based on an advertisement campaign for users using the ride service application and comprises a cheaper fare than a different travel route that the user receives for taking the travel route having the advertisement campaign. An option to select at least the different travel route may be provided in the ride service application, which may have a different fare based on not taking the travel route with the advertisement campaign.

Additionally, the travel route may be output through the application in a map interface. For example, a service provider may cause a map application interface in the application to display in a GUI of the device. In further embodiments where the at least one additional user has entered the route selection preference, an option to display the one of the plurality of travel routes may be provided to the user viewing the travel route in the interface, wherein the one of the plurality of travel routes associated with the route selection preference comprises one of a shorter travel route or a faster travel route than the travel route previously determined, and wherein the option requires a compensation amount for display of the one of the plurality of travel routes. The user may also have a payment preference for providing or receiving compensation, including the compensation amount, and the travel route may be determined based on whether the payment preference meets or exceeds the compensation amount.

In further embodiments, traffic data may be tracked for multiple travel routes including the determined travel route, which may cause selection of the determined travel route. The user receiving the travel route may have or establish a user preference or information that comprises at least one of a member status of the user with the system, a credit amount of funds available for the user with the system, and a route recalculation option may be provided in the map application interface with the travel route based on such user preferences. Additionally, an attention level of the user may be determined during use of the vehicle, wherein the attention level is determined using at least one of eye movement of the user, device usage of the device by the user, audible voice sound within the vehicle, additional sound in the vehicle, or a number of users in the vehicle. The travel route may be determined using the attention level.

Figure 5:
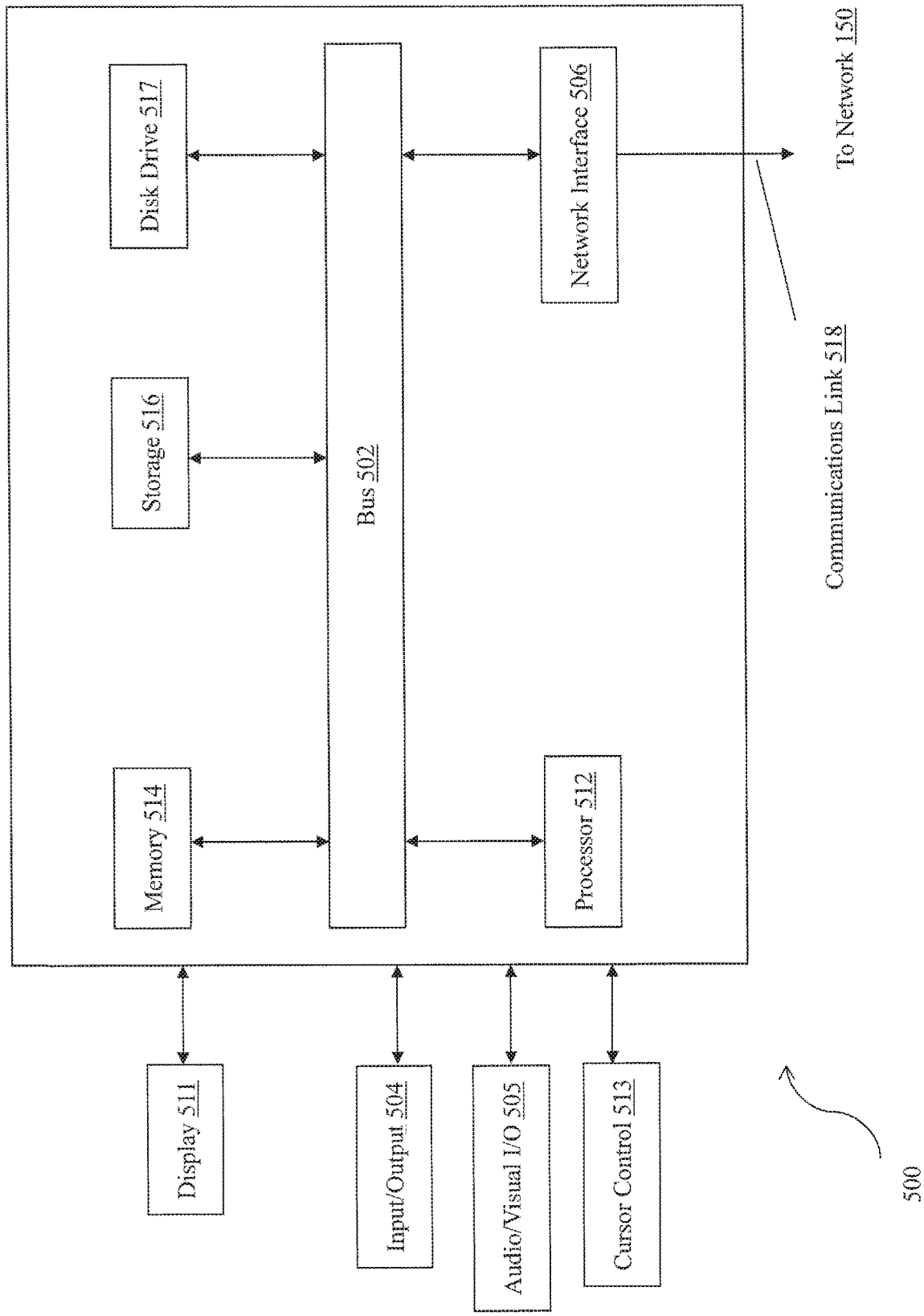
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, BLUETOOTH™ device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising;
   a non-transitory memory storing instructions; and
   a processor configured to execute the instructions to cause the system to perform operations, the operations comprising:
      receiving, via a network communication, a request for a travel route from a first location to a second location;
      accessing, from an application programming interface (API) of a travel processing engine, map data for a plurality of travel routes between the first location and the second location;
      retrieving, from a database, the plurality of travel routes using the map data;
      causing to be displayed, in a map application interface of a first device, the plurality of travel routes for a vehicle;
      providing an option on a second device to enter a route selection preference for the travel route from the plurality of travel routes; and
      causing the second device to display compensation amounts corresponding to the plurality of travel routes.

2. The system of claim 1, wherein executing the instructions further causes the system to perform operations comprising:
   receiving a selection of the travel route from the plurality of travel routes from the second device.

3. The system of claim 1, wherein executing the instructions further causes the system to perform operations comprising:
   causing the first device to display compensation amounts corresponding to the plurality of travel routes.

4. The system of claim 1, wherein executing the instructions further causes the system to perform operations comprising:
   providing traffic data for the plurality of travel routes; and
   causing to be displayed, in the map application interface of the first device, the traffic data with the plurality of travel routes.

5. The system of claim 1, wherein executing the instructions further causes the system to perform operations comprising:
   receiving the entered route selection preference for the travel route; and
   causing to be displayed, on the second device, an advertisement associated with the travel route corresponding to the entered route selection preference.

6. The system of claim 1, wherein executing the instructions further causes the system to perform operations comprising:
   providing a second option to calculate a different travel route than the plurality of travel routes displayed on the map application interface;
   in response to receiving a selection of the second option, determining at least one different travel route than the plurality of travel routes; and
   causing to be displayed, in the map application interface of the first device, the at least one different travel route.

7. The system of claim 1, wherein executing the instructions further causes the system to perform operations comprising:
   providing an option on the first device to enter another route selection preference for the travel route from the plurality of travel routes; and
   receiving a selection of another travel route from the plurality of travel routes from the first device.

8. A system comprising:
   a non-transitory memory storing instructions; and
   a processor configured to execute the instructions to cause the system to perform operations, the operations comprising:
      receiving, via a network communication, a request for a travel route from a first location to a second location;
      accessing, from an application programming interface (API) of a travel processing engine, map data for a plurality of travel routes between the first location and the second location;
      retrieving, from a database, a route selection criteria established for each of the plurality of travel routes using the map data;
      determining travel route data for the plurality of travel routes for a vehicle based on the route selection criteria;
      causing to be displayed, in a map application interface of a user device, the plurality of travel routes using the travel route data;
      providing an option for a user of the user device to enter a route selection preference for the travel route from the plurality of travel routes; and
      provide compensation to a user account, the compensation associated with receiving the entered route selection preference.

9. The system of claim 8, wherein the option to enter the route selection preference is provided to a second user device.

10. The system of claim 8, wherein executing the instructions further causes the system to perform operations comprising:
   receiving the entered route selection preference selecting the travel route from the plurality of travel routes; and
   determining the compensation associated with the travel route, wherein the compensation corresponds to a length of the travel route.

11. The system of claim 8, wherein executing the instructions further causes the system to perform operations comprising:
   receiving an indication that a second user is traveling along the travel route corresponding to the entered route selection preference; and
   providing a portion of the compensation to a second user account associated with the second user.

12. The system of claim 8, wherein executing the instructions further causes the system to perform operations comprising:
   providing a second option for the user of the user device to enter a re-route selection preference;
   causing to be displayed, in the map application interface, a second plurality of travel routes based on a current location and the travel route data;
   providing a third option to enter an alternative route preference from the second plurality of travel routes; and
   modifying the compensation to the user account, the modified compensation associated with the entered alternative route preference.

13. The system of claim 8, wherein executing the instructions further causes the system to perform operations comprising:
   causing to be displayed, in the map application interface of the user device, a plurality of compensations associated with the plurality of travel routes, wherein the plurality of compensations vary based on travel criteria associated with the plurality of travel routes.

14. A system comprising:
   a non-transitory memory storing instructions; and
   a processor configured to execute the instructions to cause the system to perform operations comprising:
      receiving, via a network communication, a request for a travel route from a first location to a second location;
      accessing, from an application programming interface (API) of a travel processing engine, map data for a plurality of travel routes between the first location and the second location;
      retrieving, from a database, a route selection criteria established for each of the plurality of travel routes using the map data;
      determining travel route data for the plurality of travel routes for a vehicle based on the route selection criteria;
      causing to be displayed, in a map application interface of a user device, the plurality of travel routes using the travel route data;
      providing an option for a user of the user device to enter a route selection preference for the travel route from the plurality of travel routes;
      causing an advertisement campaign to be displayed in response to receiving the entered route selection preference; and
      accruing a credit compensation at an account of the user of the user device in response to causing the advertisement campaign to be displayed on the user device.

15. The system of claim 14, wherein the advertisement campaign corresponds to a location of an entity along the travel route corresponding to the entered route selection preference.

16. The system of claim 14, wherein executing the instructions further causes the system to perform operations comprising:
   causing to be displayed, in the map application interface of the user device, a plurality of fares associated with the plurality of travel routes, wherein the plurality of fares are associated with advertisement campaigns.

17. The system of claim 14, wherein executing the instructions further causes the system to perform operations comprising:
   associating each route in the plurality of travel routes with a corresponding advertisement campaign.

18. The system of claim 14, wherein the advertisement campaign corresponds to visual sights along the travel route corresponding to the entered route selection preference.

19. The system of claim 14, wherein executing the instructions further causes the system to perform operations comprising:
   causing a second advertisement campaign to be displayed on a computing device along the travel route that corresponds to the entered route selection preference.

20. The system of claim 14, wherein executing the instructions further causes the system to perform operations comprising:
  providing traffic data for the plurality of travel routes; and
  causing to be displayed, in the map application interface of the user device, the traffic data with the plurality of travel routes, wherein the traffic data corresponds to the credit compensation for the plurality of travel routes.

\* \* \* \* \*